(No Model.)

G. R. OLIVER.
HINGE.

No. 448,301.  Patented Mar. 17, 1891.

Witnesses.
Fred S. Greenleaf
Edgar A. Godden

Inventor.
George R. Oliver,
by Crosby & Gregory,
Attys

UNITED STATES PATENT OFFICE.

GEORGE R. OLIVER, OF CAMBRIDGE, MASSACHUSETTS.

HINGE.

SPECIFICATION forming part of Letters Patent No. 448,301, dated March 17, 1891.

Application filed October 25, 1890. Serial No. 369,301. (No model.)

*To all whom it may concern:*

Be it known that I, GEORGE R. OLIVER, of Cambridge, county of Middlesex, State of Massachusetts, have invented an Improvement in Hinges, of which the following description, in connection with the accompanying drawings, is a specification, like letters on the drawings representing like parts.

This invention relates to a hinge of novel construction, as will be described, especially adapted, among other things, to be used in connection with the cover of an upright piano.

My invention therefore consists in the herein-described hinge, it consisting of two parts or members, one part having a socket and a pin extended into said socket, the other part having a boss or journal provided with grooves or channels to engage the said pin when the first part is secured to the second part, substantially as will be described.

Figure 1:
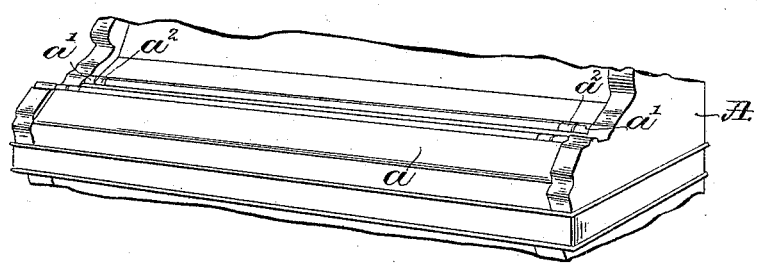
Figure 2:
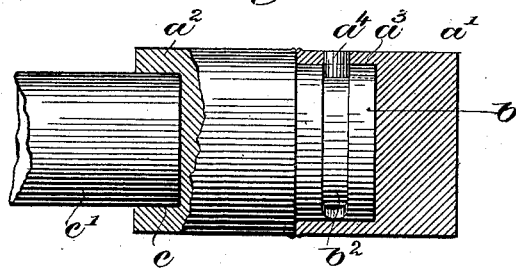
Figure 3:
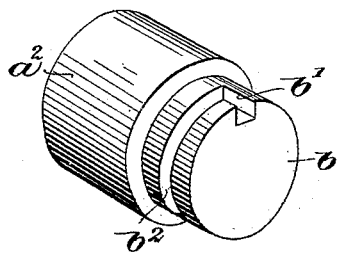

Figure 1 represents a sufficient portion of an upright piano having its cover fastened to its frame or casing with hinges embodying my invention; Fig. 2, a longitudinal section and elevation of the hinge shown in Fig. 1, and Fig. 3 a detail to be referred to.

Referring to Fig. 1, A represents the casing or wood-work of an upright piano of any usual or well-known construction, it being provided with the usual cover $a$, which folds down over the key-board when the piano is closed, as shown. The cover $a$ is secured to the casing A by hinges located on the rear side of the cover at its opposite ends.

Each hinge is composed of two parts or members $a'$, $a^2$, (see Fig. 2,) the member $a'$ in practice being fastened in any suitable or desired manner to the casing of the piano. The member $a'$ is provided on its inner end with a substantially cylindrical socket $a^3$, and the said member is provided with a pin or stud $a^4$, extended into the said socket. The member $a^2$ in practice forms the movable part of the hinge, and is made as a cylindrical hub, having at one end a cylindrical boss or journal $b$, provided with a longitudinal channel or groove $b'$, communicating with a peripheral groove or channel $b^2$, extended, as herein shown, about one-third around the circumference of the boss or journal $b$. The movable member $a^2$ is secured to the fixed member $a'$ by inserting the boss or journal $b$ into the socket $a^3$ of the fixed member, the pin or stud $a^4$ being fitted into the channel or groove $b'$, and when the boss or projection $b$ is extended into the socket far enough to bring the groove or channel $b^2$ into engagement with the pin or stud $a^4$ the movable member is given a partial rotation to bring the channel $b'$ out of line with the pin $a^4$, and thus lock the movable member to the fixed member. The movable member $a^2$ is provided, as herein shown, with a socket or hole $c$ into which is fitted the end of a connecting bar or rod $c'$, which is herein shown as made in a single piece extending substantially the length of the cover, the said bar joining the movable member $a^2$ of the hinges located at the ends of the cover $a$, the latter being fastened to the said bar and movable member $a^2$ in any usual or well-known manner. The pin $a^4$ on the fixed member serves as a stop for the movable member, so that the backward or upward movement of the cover, and also, if desired, its forward or downward movement, may be limited.

I claim—

The herein-described hinge, it consisting of two parts or members $a'$ $a^2$, the part $a'$ having a socket $a^3$ and a pin $a^4$ extending into said socket, the movable member having a boss or journal $b$, provided with grooves or channels $b'$ $b^2$ to engage the pin $a^4$ when the member $a^2$ is secured to the member $a'$, substantially as described.

In testimony whereof I have signed my name to this specification in the presence of two subscribing witnesses.

GEORGE R. OLIVER.

Witnesses:
 JAS. H. CHURCHILL,
 EMMA J. BENNETT.